(12) United States Patent
Penner et al.

(10) Patent No.: US 9,473,406 B2
(45) Date of Patent: Oct. 18, 2016

(54) ON-DEMAND ADAPTIVE BITRATE MANAGEMENT FOR STREAMING MEDIA OVER PACKET NETWORKS

(75) Inventors: Andrew Penner, Savoy, IL (US); Frederick Koopmans, Sunnyvale, CA (US); Robert Kidd, Urbana, IL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 360 days.

(21) Appl. No.: 13/492,032

(22) Filed: Jun. 8, 2012

(65) Prior Publication Data

US 2012/0317308 A1 Dec. 13, 2012

Related U.S. Application Data

(60) Provisional application No. 61/495,949, filed on Jun. 10, 2011.

(51) Int. Cl.
  *G06F 15/173* (2006.01)
  *H04L 12/801* (2013.01)
  *H04L 29/06* (2006.01)
  *H04N 21/2662* (2011.01)
  *H04N 21/6379* (2011.01)

(52) U.S. Cl.
  CPC ........... *H04L 47/11* (2013.01); *H04L 65/4092* (2013.01); *H04L 65/605* (2013.01); *H04N 21/2662* (2013.01); *H04N 21/6379* (2013.01)

(58) Field of Classification Search
  CPC ............... H04N 21/2402; H04N 21/2662; H04N 21/2387; H04W 28/10; H04L 47/25; H04L 47/11
  USPC .................................................. 709/233, 239
  See application file for complete search history.

(56) References Cited

U.S. PATENT DOCUMENTS

| | | | |
|---|---|---|---|
| 6,535,485 B1 * | 3/2003 | Story | 370/231 |
| 7,209,472 B2 * | 4/2007 | Ohta et al. | 370/351 |
| 7,627,684 B2 | 12/2009 | Boucher et al. | |
| 7,653,539 B2 | 1/2010 | Yamanashi et al. | |

(Continued)

FOREIGN PATENT DOCUMENTS

| | | |
|---|---|---|
| EP | 1 202 487 | 5/2002 |
| EP | 1202487 | 5/2002 |
| EP | 1 294 193 | 3/2003 |
| WO | WO 2005/022845 | 3/2005 |
| WO | WO 2007/018841 | 2/2007 |
| WO | 2009/009141 | 1/2009 |

OTHER PUBLICATIONS

Baldo, Nicola, et al., "RTCP Feedback Based Transmission Rate Control for 3G Wireless Multimedia Streaming," IEEE, 0-7803-8523-3/04 (2004), pp. 1817-1821.

(Continued)

*Primary Examiner* — Jerry Dennison
(74) *Attorney, Agent, or Firm* — Finnegan, Henderson, Farabow, Garrett & Dunner LLP

(57) ABSTRACT

A system and method for acquiring media data to be transmitted through a media network to a terminal and receiving a receiver report from the terminal, and estimating the condition of the network using information from the receiver report. Determining a data path based on whether the media network is congested, wherein the data path is a compression data path if the media network is congested, or the data path is a pass-through data path if the media network is not congested; and providing the media data through the determined data path.

18 Claims, 5 Drawing Sheets

(56) References Cited

U.S. PATENT DOCUMENTS

| | | | |
|---|---|---|---|
| 7,720,983 B2 | 5/2010 | Klemets et al. | |
| 7,747,764 B2 | 6/2010 | Batke et al. | |
| 7,764,668 B2 | 7/2010 | Yoshizawa et al. | |
| 7,779,443 B2 | 8/2010 | Kim | |
| 2002/0010938 A1 | 1/2002 | Zhang et al. | |
| 2002/0103554 A1 | 8/2002 | Coles et al. | |
| 2002/0154694 A1 | 10/2002 | Birch | |
| 2002/0172209 A1* | 11/2002 | Ohta et al. | 370/401 |
| 2003/0023738 A1 | 1/2003 | Boivie et al. | |
| 2003/0177396 A1* | 9/2003 | Bartlett et al. | 713/201 |
| 2004/0107284 A1 | 6/2004 | Koperda et al. | |
| 2004/0170179 A1 | 9/2004 | Johansson et al. | |
| 2004/0267445 A1 | 12/2004 | De Luca et al. | |
| 2005/0005020 A1 | 1/2005 | Rey et al. | |
| 2005/0036698 A1 | 2/2005 | Beom | |
| 2005/0105471 A1 | 5/2005 | Ido et al. | |
| 2005/0175093 A1 | 8/2005 | Haskell et al. | |
| 2005/0180502 A1 | 8/2005 | Puri | |
| 2005/0210155 A1 | 9/2005 | Oeda et al. | |
| 2005/0259947 A1 | 11/2005 | Wang et al. | |
| 2005/0262251 A1 | 11/2005 | Klemets et al. | |
| 2005/0283809 A1 | 12/2005 | Kim | |
| 2005/0286422 A1* | 12/2005 | Funato | 370/235 |
| 2006/0083260 A1 | 4/2006 | Wang et al. | |
| 2006/0092867 A1 | 5/2006 | Muller et al. | |
| 2006/0095943 A1 | 5/2006 | Dermircin et al. | |
| 2006/0156347 A1 | 7/2006 | Zhang et al. | |
| 2006/0165166 A1 | 7/2006 | Chou et al. | |
| 2006/0182027 A1 | 8/2006 | Conte et al. | |
| 2006/0184688 A1 | 8/2006 | Ganguly et al. | |
| 2006/0203831 A1 | 9/2006 | Yoshizawa et al. | |
| 2007/0091920 A1 | 4/2007 | Harris et al. | |
| 2007/0208557 A1 | 9/2007 | Li et al. | |
| 2008/0120424 A1 | 5/2008 | Deshpande | |
| 2008/0175273 A1* | 7/2008 | Johansson et al. | 370/473 |
| 2008/0195743 A1 | 8/2008 | Brueck et al. | |
| 2008/0198929 A1 | 8/2008 | Fujihara | |
| 2009/0013366 A1 | 1/2009 | You et al. | |
| 2009/0019178 A1* | 1/2009 | Melnyk et al. | 709/233 |
| 2009/0254657 A1 | 10/2009 | Melnyk et al. | |
| 2009/0327698 A1 | 12/2009 | Baker et al. | |
| 2010/0074535 A1 | 3/2010 | Bennett | |
| 2010/0205318 A1 | 8/2010 | Melnyk et al. | |
| 2010/0333148 A1* | 12/2010 | Musha et al. | 725/81 |
| 2011/0019669 A1* | 1/2011 | Ma et al. | 370/389 |
| 2012/0317308 A1* | 12/2012 | Penner et al. | 709/239 |

OTHER PUBLICATIONS

Basso, Andrea, et al., "Performance Evaluation of MPEG-4 Video over Realistic Edge Wireless Networks," IEEE, 0-7803-7442-8/02 (2002), pp. 1118-1122.

Qu, Qi, et al., "Network-Aware Source-Adaptive Video Coding for Wireless Applications," 0-7803-8847-X/04 MILCOM (2004), Military Communications Conference, pp. 848-854.

Schulzrinne, H. et al., "RTP: A Transport Protocol for Real-Time Applications," Network Working Group, Jul. 2003, pp. 1-103.

International Search Report and Written Opinion mailed Oct. 10, 2008 for International Appl. No. PCT/US2008/008556.

International Search Report and Written Opinion mailed Apr. 7, 2010 for International Appl. No. PCT/US2010/000302.

Office Action mailed on Mar. 18, 2010 in related U.S. Appl. No. 12/170,347, filed Jul. 9, 2008.

Office Action mailed on Sep. 1, 2010 in related U.S. Appl. No. 12/170,347, filed Jul. 9, 2008.

Office Action mailed Sep. 24, 2010 in related U.S. Appl. No. 12/416,085, filed Mar. 31, 2009.

International Search Report and Written Opinion mailed Sep. 13, 2010 for International Appl. No. PCT/US2010/000959.

Notice of Allowance and Examiner Interview Summary mailed on Mar. 25, 2011 in related U.S. Appl. No. 12/170,347, filed Jul. 9, 2008.

Notice of Alowance and Examiner Interview Summary mailed on Mar. 29, 2011 in related U.S. Appl. No. 12/416,085, filed Mar. 31, 2009.

Melnyk, M. et al. "Adaptive Bitrate Management for Streaming Media Over Packet Networks"; U.S. Appl. No. 12/416,085, filed Mar. 31, 2008; pp. 1-46.

Office Action mailed May 12, 2011 in related U.S. Appl. No. 12/368,260, filed Feb. 9, 2009.

Melnyk, M. et al. "Method for Controlling Download Rate of Real-Time Streaming as Needed by Media Player," U.S. Appl. No. 12/368,260, filed Feb. 9, 2009; pp. 1-44.

International Preliminary Report on Patentability and Written Opinion for PCT Application No. PCT/US2010/000959 issued Oct. 4, 2011.

Office Action mailed Oct. 25, 2011 in related U.S. Appl. No. 13/190,238, filed Jul. 25, 2011.

Office Action mailed Nov. 23, 2011 in related U.S. Appl. No. 13/194,761, filed Jul. 29, 2011.

Office Action dated Aug. 4, 2011 in related European Application No. 08780143.7 filed Jan. 28, 2010.

Final Office Action dated Nov. 17, 2011, in related U.S. Appl. No. 12/368,260, filed Feb. 9, 2009.

Office Action dated Apr. 4, 2012, in related European Application No. 08780143.7, filed Jan. 28, 2010.

Notice of Allowance mailed Apr. 25, 2012 for U.S. Appl. No. 13/194,761.

Notice of Allowance mailed Mar. 29, 2012 for U.S. Appl. No. 13/190,238.

PCT Notification of Transmittal of the International Search Report and Written Opinion for International Application No. PCT/US2012/041706, mailed Nov. 8, 2012, 10 pages.

* cited by examiner

ON-DEMAND ADAPTIVE BITRATE
MANAGEMENT FOR STREAMING MEDIA
OVER PACKET NETWORKS

CROSS REFERENCE TO RELATED PATENTS

This application claims the benefit of U.S. Provisional Application No. 61/495,949, "On-demand Adaptive Bitrate Management for Streaming Media over Packet Networks," filed Jun. 10, 2011, herein incorporated by reference.

BACKGROUND INFORMATION

Rate control is essential for media streaming over packet networks. The challenge in delivering bandwidth-intensive content like multimedia over capacity-limited, shared links (such as over a cellular network) is to quickly respond to changes in network conditions by adjusting the bitrate and the media encoding scheme with a bitrate manager to optimize the viewing and listening experience of the user. In particular, when transferring a media stream over a connection that cannot provide the necessary throughput, several undesirable effects arise. For example, a network buffer may overflow, resulting in packet loss causing garbled video or audio playback, or a media player buffer may underflow resulting in playback stall. Accordingly, media is often compressed to accommodate the reduced bandwidth of the connection.

The traditional bitrate manager modifies every video frame so that the output of the encoding process is suited for the bandwidth available for transmission. In this type of system, all media frames are processed by a "compression" data path. The compression data path is needed because of the stateful nature of video encoding. That is, to encode an output frame, regardless of the bitrate, the encoders need a live history of the processing state corresponding to the codec algorithms being used. A problem with this approach is the need of continuously process video (decoding, re-encoding), even if no network degradation is present.

DETAILED DESCRIPTION OF DRAWINGS

Reference will now be made in detail to the exemplary embodiments, the examples of which are illustrated in the accompanying drawings. Wherever possible, the same reference numbers will be used throughout the drawings to refer to the same or like parts.

Adjusting the bitrate of streaming media sessions according to instantaneous network capacity can be a critical function required to deliver streaming media over wireless packet networks. Adaptive bitrate management is a comprehensive framework and method that enables the delivery of self-adjusting streaming or pseudo-streaming sessions to a terminal's media player. Adaptive bitrate management includes, among other things, an adaptive bitrate controller, that actively monitors current level of network congestion between an adaptive bitrate manager and the terminal. If the network is congested, the adaptive bitrate manager processes data using a compression data path. The bitrate of media data switched through the compression data path is reduced to a level to avoid stalling when the media is played on a media player of a mobile device.

Additionally, if the network is not congested, the adaptive bitrate manager switches media data through the pass-through data path. Media data switched through the pass-through data path is not compressed, thereby, requiring minimal use of system resources relative to data switched through the compression data path. The pass-through data path is also advantageous because it does not to produce any perceptual artifacts in the media stream.

Adaptive bitrate management can be applied to all media transports (or protocol suites) that can be used for media transfer and provide transmission progress report mechanisms. The transmission progress report can apply to a multimedia session as a whole, or individual multimedia streams (audio, video, text, etc). The adaptive bitrate manager can include the ability to provide, to the sender, a way to map media time information to the bytes received by the receiver, either explicitly as in the case of RTCP, or implicitly, as in the TCP case through ACK packets.

Figure 1:
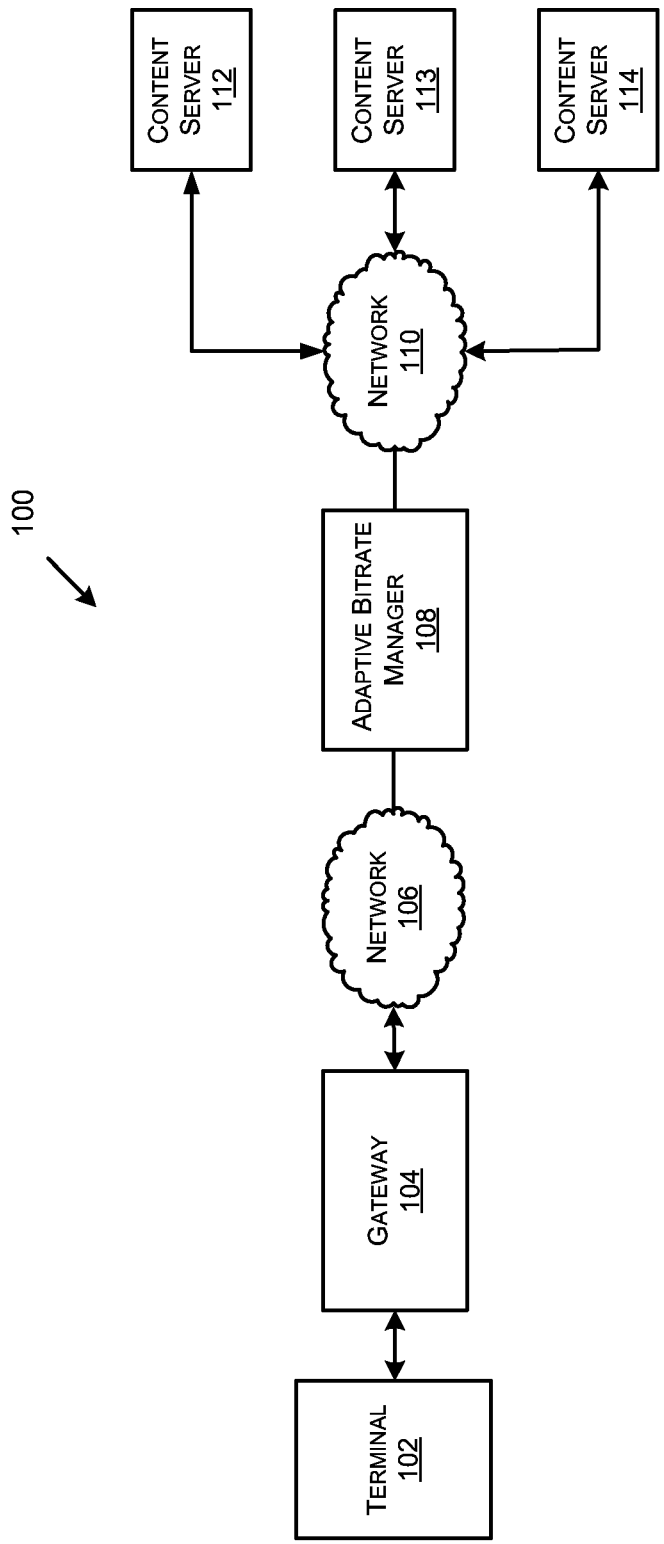
FIG. 1 is a block diagram of an exemplary system.

FIG. 1 is a block diagram of an exemplary system. Exemplary system 100 can be any type of system that transmits data packets over a network. For example, the exemplary system can include a mobile terminal accessing streaming media data from content servers through the Internet. The exemplary system can include, among other things, a terminal 102, a gateway 104, one or more networks 106 and 110, an adaptive bitrate manager 108, and one or more content servers 112-114.

Terminal 102 is a hardware component including software applications that allow terminal 102 to communicate and receive packets corresponding to streaming media. Terminal 102 provides a display and one or more software applications, such as a media player, for displaying streaming media to a user of terminal 102. Further, terminal 102 has the capability of requesting and receiving data packets, such as data packets of streaming media, from the Internet. For example, terminal 102 can send request data to content servers 112-114 for a particular file or object data of a web page by its URL, and the content server of the web page can query the object data in a database and send the corresponding response data to terminal 102. In some embodiments, response data may be routed through adaptive bitrate manager 108.

While terminal 102 can be a wired terminal, some embodiments may prefer using a mobile terminal because mobile terminals are more likely to be in networks that would benefit more from an adaptive bitrate manager. The network connection tends to be less stable as compared to wired network connection due to, for example, the changing position of the mobile terminal where data rate transmissions between the mobile terminal and the network can fluctuate, in some cases quite dramatically.

Gateway 104 is a device that converts formatted data provided in one type of network to a particular format required for another type of network. Gateway 104, for example, may be a server, a router, a firewall server, a host, or a proxy server. Gateway 104 has the ability to transform the signals received from terminal 102 into a signal that network 106 can understand and vice versa. Gateway 104 may be capable of processing audio, video, and T.120 transmissions alone or in any combination, and is capable of full duplex media translations.

Networks 106 and 110 can include any combination of wide area networks (WANs), local area networks (LANs), or wireless networks suitable for packet-type communications, such as Internet communications. Further, networks 106 and 110 can include buffers for storing packets prior to transmitting them to their intended destination.

Adaptive bitrate manager 108 is a server that provides communications between gateway 104 and content servers 112-114. Adaptive bitrate manager 108 can optimize performance by adjusting a streaming media bitrate according to the connection, i.e., media network, between adaptive bitrate manager 108 and terminal 102. Adaptive bitrate manager 108 includes both a compression path and a pass-through path. The compression path is used when network 106 is congested. How adaptive bitrate manager 108 determines whether network 106 is congested is discussed in detail below. Otherwise, the pass-through data path is used to transport received media without compression. In some embodiments, data provided to the pass-through data path may be subject to lossless compression. For example, lossless compression may be applied to adjust the media stream to a playback rate. The compression path and the pass-through path are discussed in detail below.

Adaptive bitrate manager 108 can have one or more processors and at least one memory for storing program instructions. The processor(s) can be a single or multiple microprocessors, field programmable gate arrays (FPGAs), or digital signal processors (DSPs) capable of executing particular sets of instructions. Computer-readable instructions can be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods can be implemented in hardware components or combinations of hardware and software such as, for example, ASICs, special purpose computers, or general purpose computers.

Content servers 112-114 are servers that receive the request data from terminal 102, process the request data accordingly, and return the response data back to terminal 102 through, in some embodiments, adaptive bitrate manager 108. For example, content servers 112-114 can be a web server, an enterprise server, or any other type of server. Content servers 112-114 can be a computer or a computer program responsible for accepting requests (e.g., HTTP, RTSP, or other protocols that can initiate a media session) from terminal 102 and serving terminal 102 with streaming media.

Figure 2:
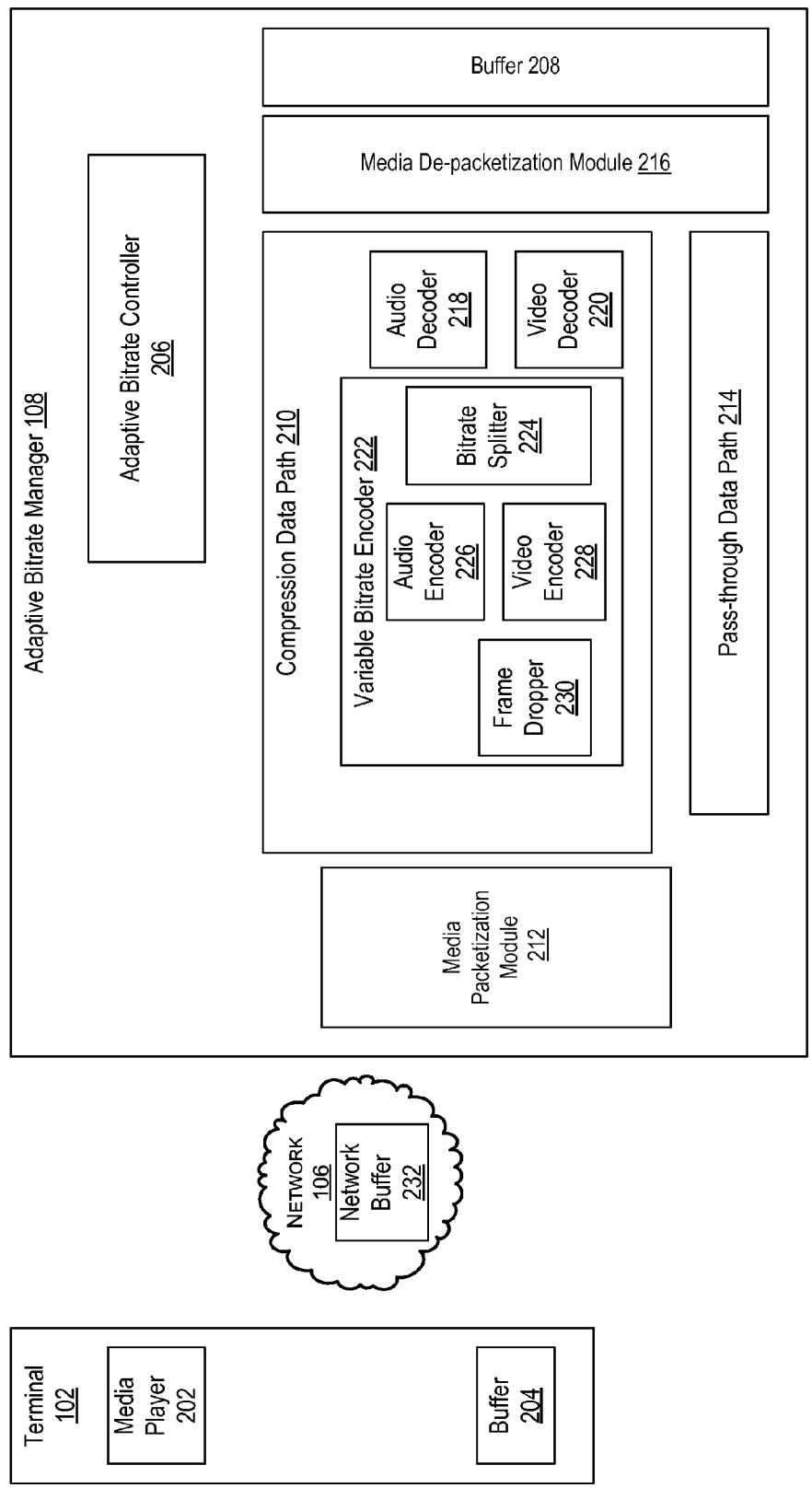
FIG. 2 is a block diagram illustrating an embodiment of the exemplary system of FIG. 1.

FIG. 2 is a block diagram illustrating an embodiment of the exemplary system of FIG. 1. Terminal 102 may include, among other things, a media player 202 and a buffer 204. Adaptive bitrate manager 108 can include, among other things, an adaptive bitrate controller 206, a buffer 208, a compression data path 210, a media packetization module 212, a pass-through data path 214, and a media de-packetization module 216.

Media player 202 is computer software for playing multimedia files (such as streaming media) including video and/or audio media files. Such popular examples of media player 202 can include Microsoft Windows Media Player, Apple Quicktime Player, RealOne Player, and Adobe Flash Plugin for web-embedded video. In some embodiments, media player 202 decompresses the streaming video or audio using a codec and plays it back on a display of terminal 102. Media player 202 can be used as a standalone application or embedded in a web page to create a video application interacting with HTML content. Further, media player 202 can provide feedback on media reception to adaptive bitrate manager 108 in the form of media receiver reports. Media receiver reports can include information regarding RTCP packets for an RTP streaming session, or information regarding TCP ACKs for a pseudo-streaming session.

Buffer 204 (also known as terminal buffer 204) is a software program and/or a hardware device that temporarily stores multimedia packets before providing the multimedia packets to media player 202. In some embodiments, buffer 204 receives the multimedia packets from adaptive bitrate manager 108 via network 106. In some embodiments, buffer 204 receives the multimedia packets from a device other than adaptive bitrate manager 108. After receiving multimedia packets (or portions of a media clip if pseudo-streaming), buffer 204 can provide the stored multimedia packets to media player 202. While FIG. 2 illustrates that terminal buffer 204 and media player 202 are separate components, one of ordinary skill the art will appreciate that terminal buffer 204 can be a part of media player 202. Further, while FIG. 2 illustrates only a single buffer, one of ordinary skill the art will appreciate that multiple buffers can exist, for example, one or more buffers for audio media packets and one or more buffers for video media packets.

Pass-through data path 214 is a transmission pathway that couples media de-packetization module 216 to media packetization module 212. Media data switched to pass-through data path 214 is passed directly to media packetization module 212 without undergoing any compression. Media data may be switched to pass-through data path 214 from media packetization module 212. In some embodiments, media data may be switched to pass-through data path 214 from a cache (not shown).

Additionally, in some embodiments not shown, when no network congestion is detected media data may be directly transferred from buffer 208 to pass-through data path 214, and then transmitted to terminal 102. In this embodiment, when no network congestion is present, adaptive bitrate manager 108 may be configured to have media data bypass media de-packetization module 216 and media packetization module 212. But once network congestion is detected, adaptive bitrate manager 108 may be configured to provide media data through media de-packetization module 216 and media packetization module 212.

Compression data path 210 includes an audio decoder 218, a video decoder 220, and a variable bitrate encoder 222. Compression data path 210 is chosen when the bitrate of the media data is higher than the available bandwidth of network 106. Compression data path 210 alters the bitrate of the media data such that it matches an optimal session bitrate provided by adaptive bitrate controller 206. Compression data path 210 is configured to provide the media data at the optimal session bitrate to media packetization module 212. Media data may be switched to compression data path 210 from media de-packetization module 216. Additionally, in some embodiments, media data may be switched to compression data path 210 from the cache (not shown).

Adaptive bitrate controller 206 is a software program and/or hardware device that periodically receives media receiver reports, e.g., such as RTCP receiver reports or TCP ACKs, from terminal 102. Adaptive bitrate controller 206 is configured to control whether data is switched through pass-through data path 214 or compression data path 210. After adaptive bitrate controller 206 makes a path determination, it is configured to instruct media de-packetization module 216 to switch the media data to the appropriate data path. As discussed in detail below, adaptive bitrate controller 206 is configured to calculate one or more network state estimators that may be used in the path determination process.

Adaptive bitrate controller 206 is configured to provide an optimal session bitrate to be used during the next period for encoding multimedia data to be sent to terminal 102. If adaptive bitrate controller 206 determines that media data should be switched through compression data path 210, adaptive bitrate controller 206 is configured to provide the optimal session bitrate and encoding parameters for use in compression data path 210. In some embodiments, adaptive bitrate controller 206 includes a buffer for storing the current and previous media receiver reports. To compute the optimal session bitrate, adaptive bitrate controller 206 uses one or more network state estimators for estimating the state of the streaming media network and computing the optimal session bitrate to be used in the next reporting interval. For example, these network state estimators can estimate a media time in transit (MTT), a bitrate received at terminal 102, a round trip time estimate (RTTE), and a packet loss count. Adaptive bitrate controller 206 can use the history and statistics of the estimator to implement different control algorithms to compute the optimal session bitrate.

Network state estimators can provide information for estimating how congested the network is at any point in time. As discussed below with reference to FIG. 3, network state estimators may be used by adaptive bitrate controller 206 to determine whether media data should be switched through compression data path 210 or pass-through data path 214. Other methods for sensing network congestion can be used to decide when to switch between these data paths. In some embodiments, adaptive bitrate controller 206 may be further configured to consider changes in network estimators over time in determining which data path to select.

Buffer 208 is a software program and/or a hardware device that temporarily stores media data before providing the media data to media de-packetization module 216. In some embodiments, buffer 208 receives the media data from one or more content servers 112-114 via network 110. In some embodiments, buffer 208 receives the media data from a device other than content servers 112-114. In some embodiments, buffer 208 can include a de-muxer (not shown) to separate audio and video tracks before relaying the media to variable bitrate encoder 222.

Media de-packetization module 216 is a software program and/or a hardware device that receives the media data from buffer 208. Media de-packetization module 216 is configured to assemble packets associated with the media data in the proper order that is received in packet form. Media de-packetization module 216 is configured to output the media data to compression data path 210 or pass-through data path 214, depending on the control instructions received from adaptive bitrate controller 206. In some embodiments, media de-packetization module 216 is configured to monitor the frame type of the media data. And after receiving a command to switch media data to a different data path automatically switches the media data at a key frame (e.g., Intra Frame) as discussed in detail below.

Variable bitrate encoder 222 is a software program and/or hardware device that receives optimal session bitrate data, encoding parameters, or both from adaptive bitrate controller 206 and provides, to media packetization module 212, audio and/or video data that are encoded at a bitrate matching the optimal session bitrate provided by adaptive bitrate controller 206. Variable bitrate encoder can include, among other things, a bitrate splitter 224, an audio encoder 226, a video encoder 228, and, for some embodiments, a frame dropper 230.

Bitrate splitter 224 is a software program and/or a hardware device that receives the optimal session bitrate data from adaptive bitrate controller 206 and allocates optimal bitrates to be used when encoding the audio and video media data during the next interval. The allocation is such that the summation of bitrates for all tracks, when combined, can be substantially equal to the optimal session bitrate specified by adaptive bitrate controller 206. For example, this allocation could be based on a predetermined allocation, user preference, optimal performance data, privileging one type of data over the other, the amount of audio and video data to be provided, and/or any combination of the above. For example, bitrate splitter 224 may privilege audio quality in a way that if a reduced bitrate is specified, bitrate splitter 224 can reduce the video bitrate first and postpone reducing the audio bitrate as much as possible.

Audio encoder 226 and video encoder 228 are software programs and/or hardware devices that can receive their respective bitrate allocation from bitrate splitter 224 (or from the adaptive bitrate controller 206 directly) and provide outgoing media data encoded to match the bitrate of their respective bitrate allocation for the next reporting interval. Both audio encoder 226 and video encoder 228 can receive their respective media data from buffer 208 and output this media data according to its respective bitrate allocation from bitrate splitter 224. After the bitrate has been determined for both audio and video, it is the responsibility of each encoder to deliver maximum quality in the corresponding media track. For example, audio encoder 226 can generate variable bitrates by adjusting spectral quantization and cutoff frequency. Further, video encoder 228 can generate variable bitrates, for example, by adjusting Discrete Cosine Transform (DCT) coefficient quantization or by introducing frame dropping. This frame dropping can be executed, when needed, by frame dropper 230.

Frame dropper 230 is a software program and/or a hardware device that can be triggered after it is determined that the desired bitrate is less than a quality threshold. This threshold can be codec dependent, and represents the bitrate value below which the use of coarser quantization leads to intolerable artifacts in the image. Frame dropper 230 can dynamically determine a frame dropping rate based on the desired video bitrate and the bitrate being generated by video encoder 228. To compensate inherent bitrate fluctuations in the video bitrate at the output of the encoder, frame dropper 230 can dynamically update the dropping rate by using a sliding window covering the byte size history of recently encoded frames.

Media packetization module 212 is a software program and/or a hardware device that receives the media data from compression data path 210 or pass-through data path 214 and translates this data into a packet format to deliver a streaming session. Media packetization module 212 can either create separate packets for video and audio data, to be transferred over separate network channels, or combine audio and video in a single media stream. Besides carrying the audio and media data, media packets can include, among other things, a payload-type identifier for identifying the type of content, a packet sequence number, time stamping for allowing synchronization and jitter calculations, and delivery monitoring data. This type of data can later assist adaptive bitrate controller 206 in determining the quality of service provided by the network when adaptive bitrate controller 206 receives a corresponding media receiver report from terminal 102. Upon translating this media data into a packet format, media packetization 216 transmits the media data through network buffer 232 of network 106 to terminal buffer 204 of terminal 102. In addition, adaptive bitrate manager 108 saves the history of sent media packets in the audio and video tracks. This history data can include, among other things, the time that each packet is sent, the sequence number, and the size of each media packet.

Figure 3:
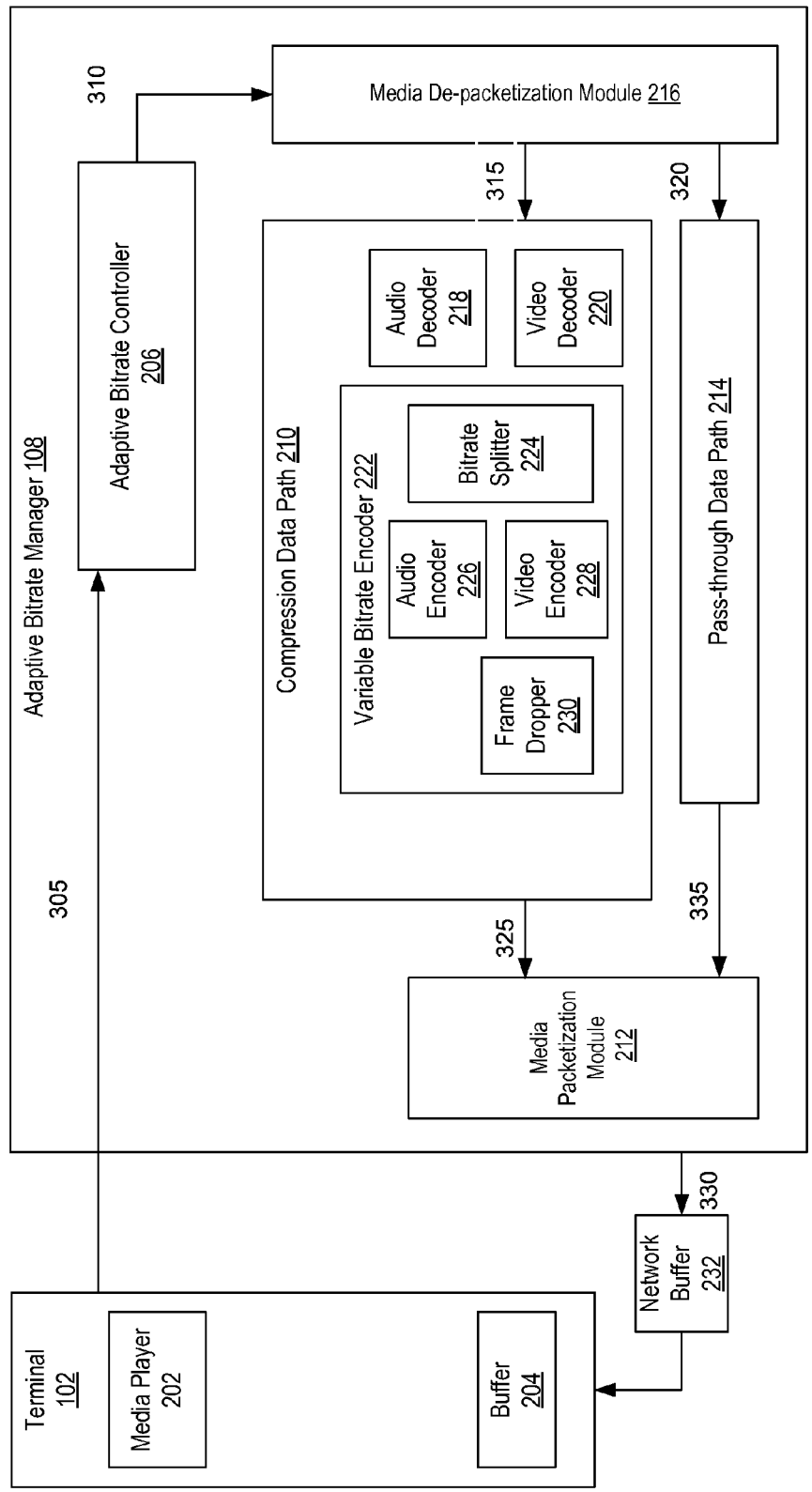
FIG. 3 is a functional diagram illustrating an exemplary communication flow in the exemplary system of FIG. 2.

FIG. 3 is a functional diagram illustrating an exemplary communication flow in the system of FIG. 2. It is assumed for purposes of explaining this exemplary embodiment that terminal 102 has already received at least some of the media data of the requested media data package. Further, it is assumed that the media data package includes both audio and video media data. After receiving packets, media player 202 transmits (305) a media receiver report to adaptive bitrate manager 108.

The media receiver report can be, for example, a RTCP receiver report or a TCP ACK in the case of pseudo-streaming. RTCP is a protocol for providing quality control information for an RTP flow, such as the transmission provided by media packetization 216 of adaptive bitrate manager 108. More specifically, RTCP can partner with media packetization module 212 of adaptive bitrate manager 108 in the delivery and packaging of multimedia data. In some embodiments, media player 202 periodically transmits the RTCP receiver report. RTCP receiver reports can provide feedback on the quality of service being provided by media packetization 216.

The most widely used method for streaming media on the Internet is HTTP based pseudo-streaming, carried by the Transmission Control Protocol (TCP). TCP implements its own generic (not media specific) packetization protocol. TCP internally uses ACKs to provide feedback on received TCP packets and therefore provides transport flow control. In the pseudo-streaming case, TCP ACK packets are used to update the key network estimators described previously.

While TCP and RTP/RTCP are used as exemplary embodiments to explain the adaptive bitrate control method, one of ordinary skill could appreciate that this adaptive bitrate control method is applicable to any protocol that fulfills the functions of media transport with sequencing and timing information and media transport feedback with information about received packets (covering sequencing, timing, loss rate, etc.).

Further, in some streaming embodiments, the media receiver report can be a single report having both audio and video report data (when audio and video are multiplexed into a single stream) or it can be separated into multiple reports (e.g., such as in the RTCP case where RTP carries audio and video in separate streams), for example, such as a receiver report for audio report data and a another receiver report for video report data. The media receiver report data can include, among other things, data regarding the sequence number of the most recently received media packet at terminal 102, the timestamp of the last packet received by terminal 102 reported in the media receiver report, the number of bits sent from this report, a round trip time, and a number of packets lost.

After receiving one or more receiver reports, adaptive bitrate controller 206 can estimate the state of the network for determining whether to update the session bitrate for the next period. Adaptive bitrate controller 206 can save newly received receiver reports in a cumulative history and record the time at which the one or more packets were received. To estimate the state of the network, adaptive bitrate controller 206 can combine data from a received media receiver report, the previously received receiver reports stored by the adaptive bitrate manager 108, and the history of sent media packets stored by adaptive bitrate manager 108. Adaptive bitrate controller 206 can estimate, for both streaming and pseudo-streaming sessions, the following exemplary data by using network state estimators:

Media Time in Transit (MTT), computed as the difference between the timestamp of the most recently sent media packet and the timestamp of the last media packet received by the player reported in receiver report. For pseudo-streaming sessions, adaptive bitrate manager 108 conducts an additional step to calculate MTT. For example, adaptive bitrate manager 108 maintains a table of sequence numbers and timestamps in the media clip sent to the player. When ACKs are received, adaptive bitrate manager 108 can retrieve the timestamp corresponding to the byte sequence number in the ACK. Using this timestamp, adaptive bitrate manager can compute the MTT.

Bitrate received ("BRR"), computed as the bits received between the current and previously received receiver reports, divided by the time elapsed between these two receiver reports. The bits received between receiver reports are computed by cross referencing sequence numbers in the receiver report with the history of bytes sent stored at adaptive bitrate manager 108.

Round Trip Time Estimate ("RTTE") can be obtained by averaging a number of the lower MTT values stored at the adaptive bitrate manager 108. For example, RTTE could be calculated by averaging the lowest 3 MTT values out of all stored MTT values for that streaming media network. Further, adaptive bitrate manager 108 can calculate the RTTE from data within an RTCP sender report. While these exemplary embodiments are illustrated, any method can be used to estimate a round trip time for the streaming media network.

Packet Loss count ("PLC"), captured directly from a media receiver report.

Adaptive bitrate controller 206 can use these one or more network state estimators to determine a level of estimated network congestion and the session bitrate for the next interval. If the network has negligible or low levels of network congestion, adaptive bitrate controller 206 is configured to instruct media de-packetization module 216 to switch media data through pass-through data path 214. Likewise, if the network is congested, adaptive bitrate controller 206 is configured to instruct media de-packetization module to switch media data through compression data path 210.

Adaptive bitrate controller 206 is configured to allow switching media data between compression data path 210 and pass-through data path 214, or vice versa, beginning with the next key frame. The key frame is a particular type of media frame at which the state of the decoder or encoder is reset. The key frame (Intra Frame), is a media frame that stores a complete image. Other frames in the data stream may include for example, predicted frames. The predicted frames store changes that occur from one frame to the next, thus, greatly reducing the amount of information that is stored.

Switching the media data to a different data path at a non-key frame (e.g., a predicted frame) may result in corruption of the media data. Accordingly, adaptive bitrate controller 206 is configured to monitor frame type of the original media data stream (e.g., arriving from content servers 112-114).

Alternatively, media-depacketization module 216, or some other module, is configured to monitor the frame type of the original media stream. After receiving a command to switch media data to a different data path, media de-packetization module 216 automatically switches the media data at the next key frame.

Figure 4A:
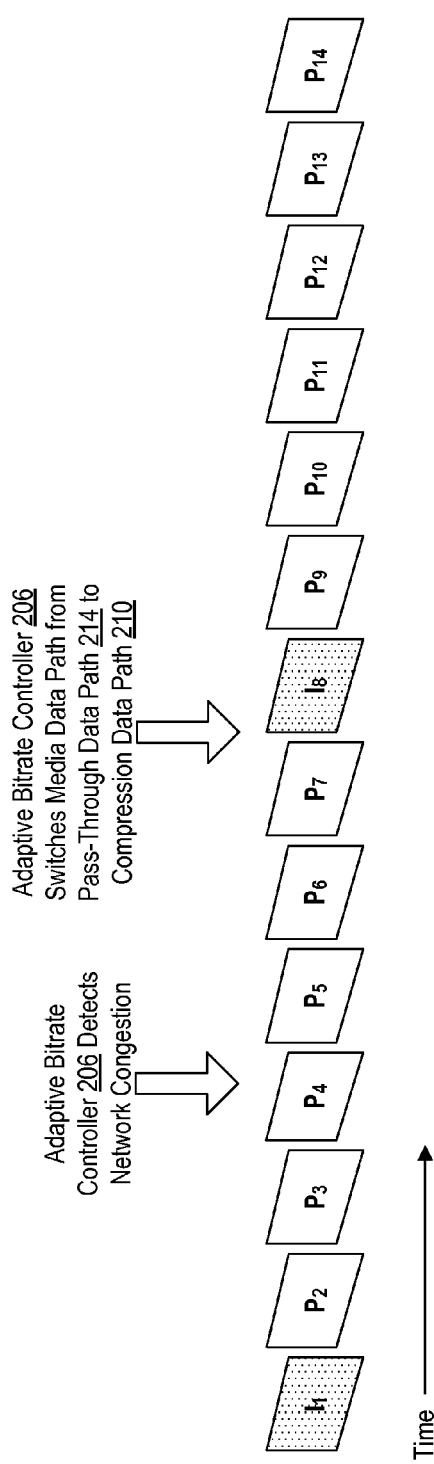
FIG. 4A illustrates an example frame sequence indicating where media data is switched in the frame sequence from a pass-through data path to a compression data path.
Figure 4B:
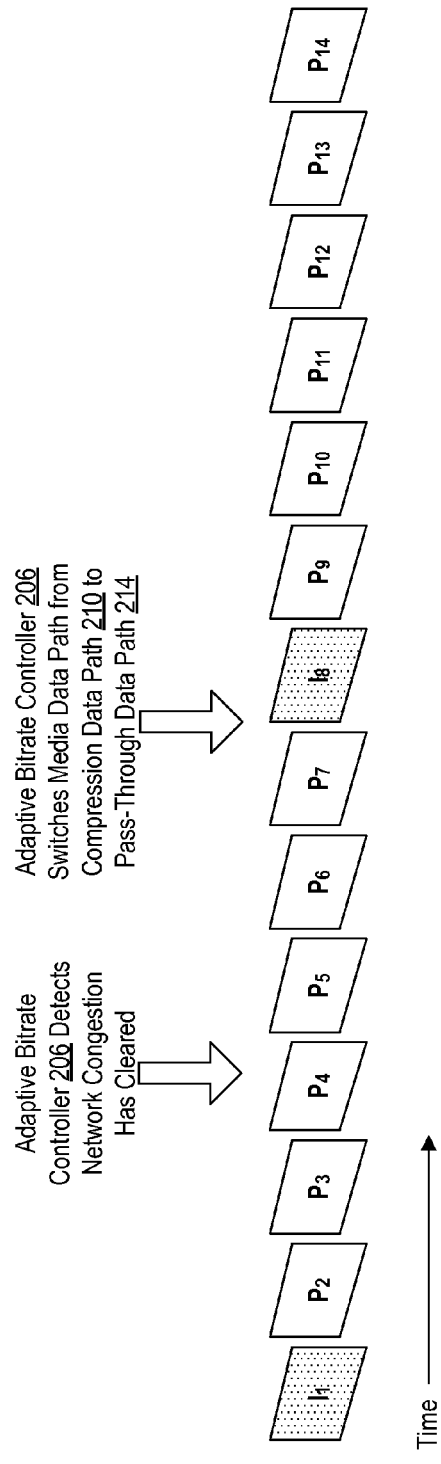
FIG. 4B illustrates an example frame sequence indicating where media data in the frame sequence is switched from a compression data path to a pass-through data path.

FIG. 4A illustrates an example frame sequence indicating where media data is switched from pass-through data path 214 to compression data path 210. The frame sequence shows key frame $I_1$ and its associated predicted frames $P_2$-$P_7$, and key frame $I_8$ and its associated predicted frames $P_9$-$P_{14}$. Adaptive bitrate controller 206 detects network congestion at $P_4$, however, because the next frame is not a key frame, the media data is not switched through compression data path 210 until $I_8$. Likewise, FIG. 4B illustrates an example frame sequence indicating where media data is switched from compression data path 210 to pass-through data path 214. Adaptive bitrate controller 206 detects network congestion has cleared at $P_4$, however, because the next frame is not a key frame, the media data is not switched through pass-through data path 214 until $I_8$.

Referring back to FIG. 3, adaptive bitrate controller 206 estimates network congestion, and hence media path selection, by comparing one or more network state estimators to a corresponding state threshold. The state threshold value indirectly determines when adaptive bitrate controller 206 instructs media de-packetization module (310) to switch media through compression data path 210 (315) or switch data through pass-through data path 214 (320). The values of the state thresholds may be set by an administrator. In some embodiments, the values of the state thresholds may be determined automatically by adaptive bitrate controller 206. Each network state estimator when compared to its corresponding network state threshold may be used to determine which data path media data is switched through. For example, an MTT may be compared to an MTT state threshold, and if the MTT is below the MTT state threshold, adaptive bitrate controller 206 may be configured to instruct media de-packetization module 216 to switch media data to be transmitted to terminal 102, beginning with the next key frame, through pass-through data path 214. If the MTT is above the MTT state threshold, adaptive bitrate controller 206 may be configured to instruct media de-packetization module 216 to switch the media data, beginning with the next key frame, through compression data path 210. Similarly, RTTE, PLC, and BRR network state estimators have respective RTTE, BRR, and PLC state thresholds which may be used to determine whether media is switched through compression data path 210 or through pass-through data path 214.

In some embodiments, adaptive bitrate controller 206 considers how the network state estimators change over time in determining network congestion. For example, adaptive bitrate controller 206 can be configured to instruct de-packetization module 221 to switch media data, beginning with the next key frame, to pass-through data path 214 if MTT values have been decreasing over time. Similarly, adaptive bitrate controller 206 can be configured to instruct de-packetization module 221 to switch media data, beginning with the next key frame, to compression data path 226 if MTT values have been increasing over time.

In some embodiments, adaptive bitrate controller 206 instructs media de-packetization module 216 based on changes in one or more network state estimators over time and one or more network state thresholds. For example, adaptive bitrate controller 206 can be configured to instruct de-packetization module 221, beginning with the next key frame, to switch media data to pass-through data path 214 if MTT values have been decreasing over time and the MTT value is below the MTT state threshold. Similarly, adaptive bitrate controller 206 can be configured to instruct de-packetization module 221 to switch media data, beginning with the next key frame, to compression data path 226 if MTT values have been increasing over time and the MTT value is above the MTT state threshold.

In some embodiments, adaptive bitrate controller 206 may select between compression data path 210 and pass-through data path 214 no matter where media de-packetization module 216 is receiving media data from. For example, media de-packetization module 216 can receive media directly from an HTTP server, e.g., content servers 112-114. Alternatively, media de-packetization module 216 can read media data from a cache, where the media data being received was already compressed by an external process. In this case, adaptive bitrate manager 108 may be configured to deliver the compressed media data to the media player through pass-through data path 214 with minimal resource utilization. If the network conditions degrade, adaptive bitrate controller 206 can switch to compression data path 210 at the appropriate time to further reduce the media bitrate and avoid playback stalling. Thus, the resources used to compress the video may be used as needed to counteract degraded network conditions.

When data is switched through compression data path 210, media data may be encoded using methods described in, for example, U.S. Pat. No. 7,991,904, U.S. Patent Application Publication No. 2011/0283012, U.S. Pat. No. 7,987,285, or U.S. Patent Application Publication No. 2011/0283015, all of which are incorporated by reference. The encoded data is then passed (325) to media packetization module 212, which translates encoded data into a packet format to deliver a streaming session (330).

After media data is switched through pass-through data path 214, media data is passed directly to media packetization module 212 without any compression (335). Media packetization module 212 translates the media data into a packet format to deliver a streaming session (330).

Additionally, in some embodiments not shown, when no network congestion is detected, adaptive bitrate manager may transfer media data from buffer 208 to pass-through data path 214, and then transmit the media data to terminal 102. Thus, when no network congestion is present, the media data bypasses media de-packetization module 216 and media packetization module 212. But once network congestion is detected, adaptive bitrate manager is configured to provide media data through media de-packetization module 216 and media packetization module 212.

Figure 5:
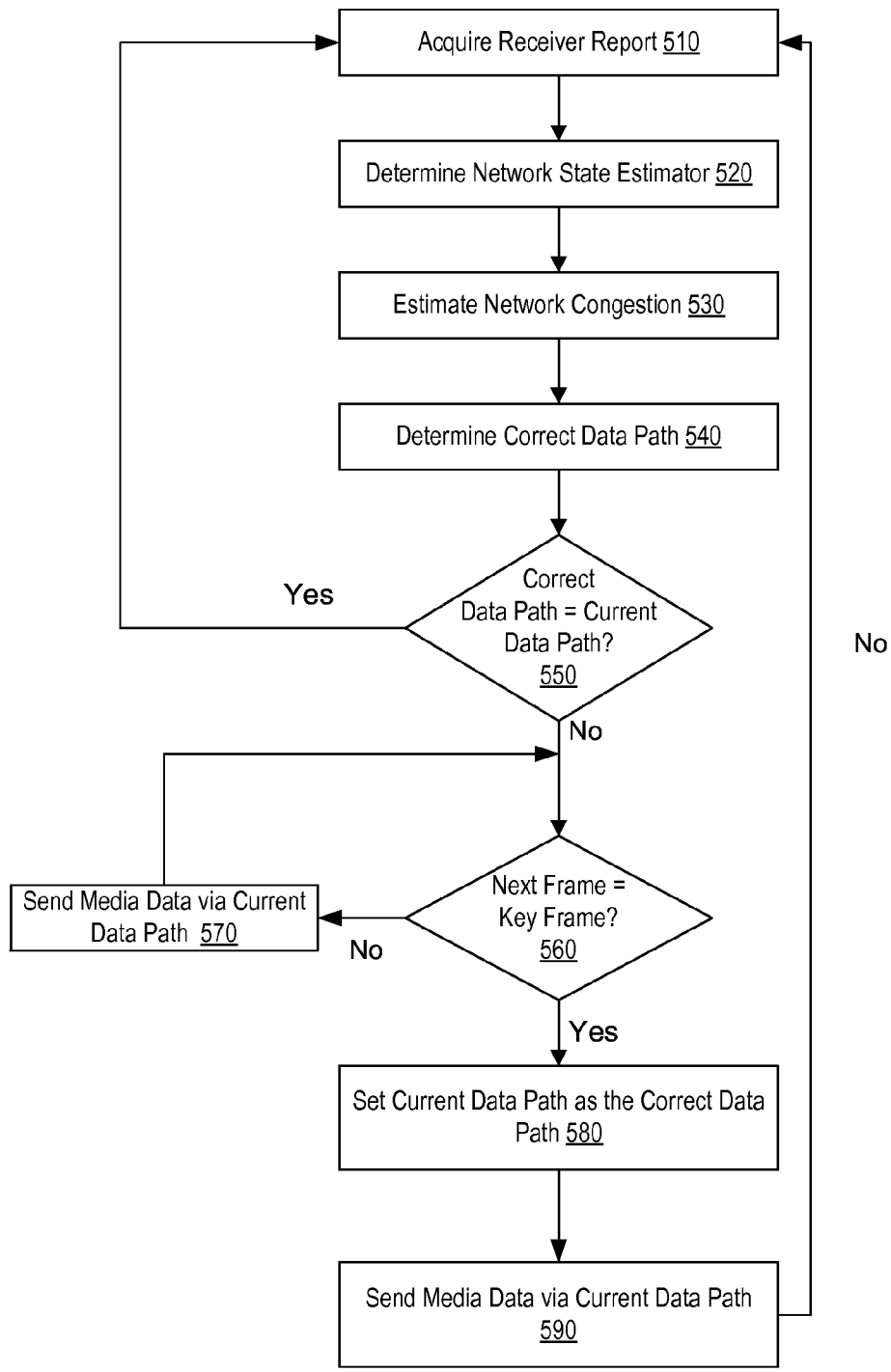
FIG. 5 is a flowchart representing an exemplary method for selecting a data path for media data.

FIG. 5 is a flowchart representing an exemplary method for selecting a data path for media data. Referring to FIG. 5, it will be readily appreciated by one of ordinary skill in the art that the illustrated procedure can be altered to delete steps or further include additional steps. It is assumed for this exemplary method that a receiver report includes data concerning both audio and video media data. If a pseudo streaming session, the TCP ACK is processed to obtain information about the media transmission progress. While both types exists, one of ordinary skill in the art will appreciate that receiver report data can include either audio or video data. After initial start step, an adaptive bitrate manager (e.g., adaptive bitrate manager 108) acquires (510)

receiver report data, which can include one or more receiver reports. This receiver report data can correlate to the quality and quantity of audio and video media packets received at a media player of a terminal. The receiver report data can include, among other things, a sequence number of a last packet received by the terminal, a timestamp corresponding to such packet, a number of bits sent, a round trip time, and number of packets lost during a transmission from the adaptive bitrate manager to the terminal. The receiver report data can be acquired by receiving a media receiver report from the terminal and by cross-correlating the contents of the last received media receiver report with the history of media packets stored at the adaptive bitrate manager.

While RTP and RTCP are user level protocols, directly accessible to the multimedia applications, TCP is typically implemented in the kernel space, in a way that applications may not have visibility of its internal state. To overcome this, a simple kernel-level agent can be implemented to generate application-level receiver reports and send them to the adaptive bitrate manager upon the reception of ACK packets in the kernel space.

After acquiring receiver report data, the adaptive bitrate manager determines one or more network state estimators (520). In some embodiments, to determine the one or more network state estimators, the adaptive bitrate manager can combine data from the received receiver report data from step 505 and previously received receiver report data stored by the adaptive bitrate manager. The determined one or more network state estimators can include MTT, BRR, RTTE, PLC, or some combination thereof. In pseudo-streaming sessions, an extra step is required to calculate MTT. The adaptive bitrate manager can maintain a table of sequence numbers and timestamps in the media clip sent to a media player. After TCP ACKs are received, adaptive bitrate manager can retrieve the timestamp corresponding to the byte sequence number in the ACK, and then compute the MTT.

In step 530, the adaptive bitrate manager estimates if the network is congested. Adaptive bitrate manager estimates network congestion by comparing one or more network state estimators to corresponding state thresholds. In some embodiments, adaptive bitrate manager also estimates network congestion based in-part on changes in one or more network state estimators over time.

In step 540, the adaptive bitrate manager determines a correct data path (540). Depending on the level of network congestion present, adaptive bitrate manager determines whether media data should be provided through a compression data path (e.g., compression data path 210) or a pass-through data path (e.g., pass-through data path 214). If the network is congested, the adaptive bitrate manager indicates that media data should be provided through the compression data path. Likewise, if the network is not congested, adaptive bitrate manager indicates that media data should be provided through the pass-through data path.

In step 550, the adaptive bitrate manager compares the correct data path to the current data path that media data is being passed. If the correct data path equals the current data path, no change in the data path is needed. The adaptive bitrate manager then continues to send media via the current data path until it no longer matches the indicated data path or there remains no additional media to be transmitted to the terminal.

If the current data path is different from the correct data path, then, in step 560, the adaptive bitrate manager determines if the next frame being transmitted is a key frame. If the frame is not a key frame, the adaptive bitrate manager continues to send the media data using the current data path. If the next frame is a key frame, in step 580, the adaptive bitrate manager sets the current data path as the correct data path for the next frame, and then sends the media data (step 590), beginning with the key frame, using the new data path.

The methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

In the preceding specification, the disclosure has been described with reference to specific exemplary embodiments. It will however, be evident that various modifications and changes may be made without departing from the broader spirit and scope of the disclosure as set forth in the claims that follow. The specification and drawings are accordingly to be regarded as illustrative rather than restrictive. Other embodiments of the disclosure may be apparent to those skilled in the art from consideration of the specification and practice disclosed herein.

What is claimed is:

1. A method comprising:
   acquiring, at a server, media data to be transmitted through a media network to a terminal;
   receiving a receiver report from the terminal;
   estimating a level of network congestion based on the receiver report;
   determining a data path in the server between an existing compression data path and an existing pass-through data path, based on the estimated level indicating whether the media network is congested, wherein the data path is the compression data path if the media network is congested, and the data path is the pass-through data path if the media network is not congested; and
   providing the media data through the determined data path in the server,
   wherein,
   the compression data path includes a encoder device and
   the pass-through data path bypasses the encoder device of the compression data path.

2. The method of claim 1, wherein the media data includes a key frame, and the media data is provided through the determined path beginning with the key frame.

3. The method of claim 1, further comprising determining a network state estimator based on the receiver report.

4. The method of claim 3, wherein the network state estimator is one of:
   media time in transit;
   bitrate received;
   round trip time estimate; and
   packet loss count.

5. The method of claim 3, wherein estimating the level of network congestion comprises comparing the network state estimator to a state threshold.

6. The method of claim 5, wherein the state threshold is automatically determined by a server.

7. A non-transitory computer readable medium storing instructions that, when executed by a computer, cause the computer to perform a method, the method comprising:
  acquiring, at a server, media data to be transmitted through a media network to a terminal;
  receiving a receiver report from the terminal;
  estimating a level of network congestion based on the receiver report;
  determining a data path in the server between an existing compression data path and an existing pass-through data path, based on the estimated level indicating whether the media network is congested, wherein the data path is a compression data path if the media network is congested, and the data path is a pass-through data path if the media network is not congested; and
  providing the media data through the determined data path in the server,
  wherein,
  the compression data path includes a encoder device, and
  the pass-through data path bypasses the encoder device of the compression data path.

8. The non-transitory computer readable medium of claim 7, wherein the media data includes a key frame, and the media data is provided through the determined path beginning with the key frame.

9. The non-transitory computer readable medium of claim 7, further comprising instructions that, when executed by a computer, cause the computer to perform the method, the method comprising, determining a network state estimator based on the receiver report.

10. The non-transitory computer readable medium of claim 9, wherein the network state estimator is one of:
  media time in transit;
  bitrate received;
  round trip time estimate; and
  packet loss count.

11. The non-transitory computer readable medium of claim 9, wherein estimating network congestion comprises comparing the network state estimator to a state threshold.

12. The non-transitory computer readable medium of claim 11, wherein the state threshold is automatically determined by a server.

13. A system comprising:
  an adaptive bitrate manager having a memory and one or more processors, the adaptive bitrate manager configured to:
  acquire, at a server, media data to be transmitted through a media network to a terminal having a media player;
  receive a receiver report from the terminal;
  estimate a level of network congestion based on the receiver report;
  determine a data path in the server between a compression data path and a pass-through data path, based on the estimated level indicating whether the media network is congested, wherein the data path is a compression data path if the media network is congested, and the data path is a pass-through data path if the media network is not congested; and
  provide the media data through the determined data path in the server,
  wherein,
  the compression data path includes a encoder device, and
  the pass-through data path bypasses the encoder device of the compression data path.

14. The system of claim 13, wherein the media data includes a key frame, and the media data is provided through the determined path beginning with the key frame.

15. The system of claim 13, wherein the one or more processors are further configured to determine a network state estimator based on the receiver report.

16. The system of claim 15, wherein the network state estimator is one of:
  media time in transit;
  bitrate received;
  round trip time estimate; and
  packet loss count.

17. The system of claim 15, wherein the one or more processors are configured to compare the network state estimator to a state threshold to estimate the network congestion.

18. The system of claim 17, wherein the one or more processors are configured to automatically determine the state threshold.

* * * * *